United States Patent [19]
King et al.

[11] Patent Number: 5,491,782
[45] Date of Patent: Feb. 13, 1996

[54] METHOD AND APPARATUS FOR LOOSELY GANGING SLIDERS ON A USER INTERFACE OF A DATA PROCESSING SYSTEM

[75] Inventors: Chen D. King, Colleyville; Raymond E. Lee, Irving; Peter Scannell, Carrollton; Robert J. Torres, Colleyville, all of Tex.

[73] Assignee: International Business Machines Corporation, Armonk, N.Y.

[21] Appl. No.: 84,824

[22] Filed: Jun. 29, 1993

[51] Int. Cl.⁶ .................................................. G06F 3/00
[52] U.S. Cl. ............................................................ 395/159
[58] Field of Search ................................. 395/155, 159; 200/50 C, 547; 381/1, 104, 109, 119

[56] References Cited

U.S. PATENT DOCUMENTS

| | | | |
|---|---|---|---|
| 2,573,122 | 10/1951 | Weber | 381/109 |
| 4,309,579 | 1/1982 | Kondo et al. | 200/5 |
| 5,054,077 | 10/1991 | Suzuki | 381/109 |
| 5,239,458 | 8/1993 | Suzuki | 381/119 |
| 5,317,641 | 5/1994 | Yasuda et al. | 381/109 |
| 5,422,993 | 6/1995 | Fleming | 395/159 |

OTHER PUBLICATIONS

"Min–Max Slider", IBM Tech Disc Bulletin, v. 33, n. 3B, pp. 31–32 (Aug. 1990).
"Multiple–Range Slider", IBM Tech Disc Bulletin, v. 35, n. 1A, pp. 198–199 (Jun. 1992).

*Primary Examiner*—Heather R. Herndon
*Assistant Examiner*—Joseph R. Burwell
*Attorney, Agent, or Firm*—Geoffrey A. Mantooth

[57] ABSTRACT

The movement of first and second sliders on a user interface of a data processing system is loosely coordinated by way of pusher member. The pusher is coupled to one of the sliders and extends over to the other slider, where it is adapted to contact a side of the other slider. The sliders move independently of each other if the pusher does not contact the other slider, as in for example, the sliders moving apart. If the pusher does contact the other slider, then both sliders become ganged and move in unison.

8 Claims, 6 Drawing Sheets

METHOD AND APPARATUS FOR LOOSELY GANGING SLIDERS ON A USER INTERFACE OF A DATA PROCESSING SYSTEM

TECHNICAL FIELD OF THE INVENTION

The present invention relates to sliders, such as slider bars or slider boxes, on graphical user interfaces of data processing systems.

BACKGROUND OF THE INVENTION

Sliders are used on visual interfaces, such as computer screens. Sliders allow a user to adjust a parameter or property on a data processing system. A slider typically includes a movable object such as a bar (or a box) that is located on a track. The slider bar can be moved along the track to adjust the parameter. The track typically represents a scale. Thus, any movement of the slider bar can be visualized relative to the scale.

Sliders frequently operate in isolation so that if plural sliders are displayed, movement of one slider bar has no affect on the others. When one parameter directly affects another parameter, it is desirable to adjust both parameters together. In the prior art, this is accomplished by providing that the motion of one slider bar controls the motion of the other, so that both slider bars can move up or down (or right or left) in unison.

However, there is no satisfactory manner in which to display partial dependencies among plural parameters. For example, a first parameter may be partially dependent upon a second parameter, wherein if the first parameter drops below a certain setting or value, then the second parameter will also drop to a lower setting. Thus, if both parameters have a scale of 1–10 and the second parameter is set to 5, moving the first parameter below 5 results in the second parameter being lowered. The setting of the first parameter is independent of the second parameter, as long as the first parameter is 5 or greater.

SUMMARY OF THE INVENTION

It is an object of the present invention to provide a method and apparatus for displaying such partial dependencies among parameters.

It is a further object of the present invention to provide a method and apparatus for loosely ganging sliders on a user interface of a data processing display.

In accordance with one aspect of the present invention, first and second sliders are displayed on a user interface of a data processing system, with the first and second sliders each being capable of being moved along a respective path. A member that is coupled to the first slider is displayed. The member extends toward the path of the second slider so as to contact a portion of the second slider when one of the sliders moves with respect to the other slider in a predetermined direction along the respective slider path.

In another aspect of the present invention, it is determined if either of the first or second sliders is moved along the respective paths. Then, it is determined if the movement causes the second slider to contact the member and if so then both sliders are moved together. The sliders are moved together by pushing the nonmoving slider with the moving slider and the member. If the movement of the moving slider does not cause the second member to contact the member, then the moving slider is moved without moving the nonmoving slider.

With the present invention, the movement of first and second sliders on a user interface is loosely coordinated by way of a pusher member. The pusher is coupled to one of the sliders and extends over to the other slider, where it is adapted to contact a side of the other slider. The sliders move independently of each other if the pusher does not contact the other slider. If the pusher does contact the other slider, then both sliders become ganged and move in unison.

DESCRIPTION OF THE INVENTION

Figure 1:
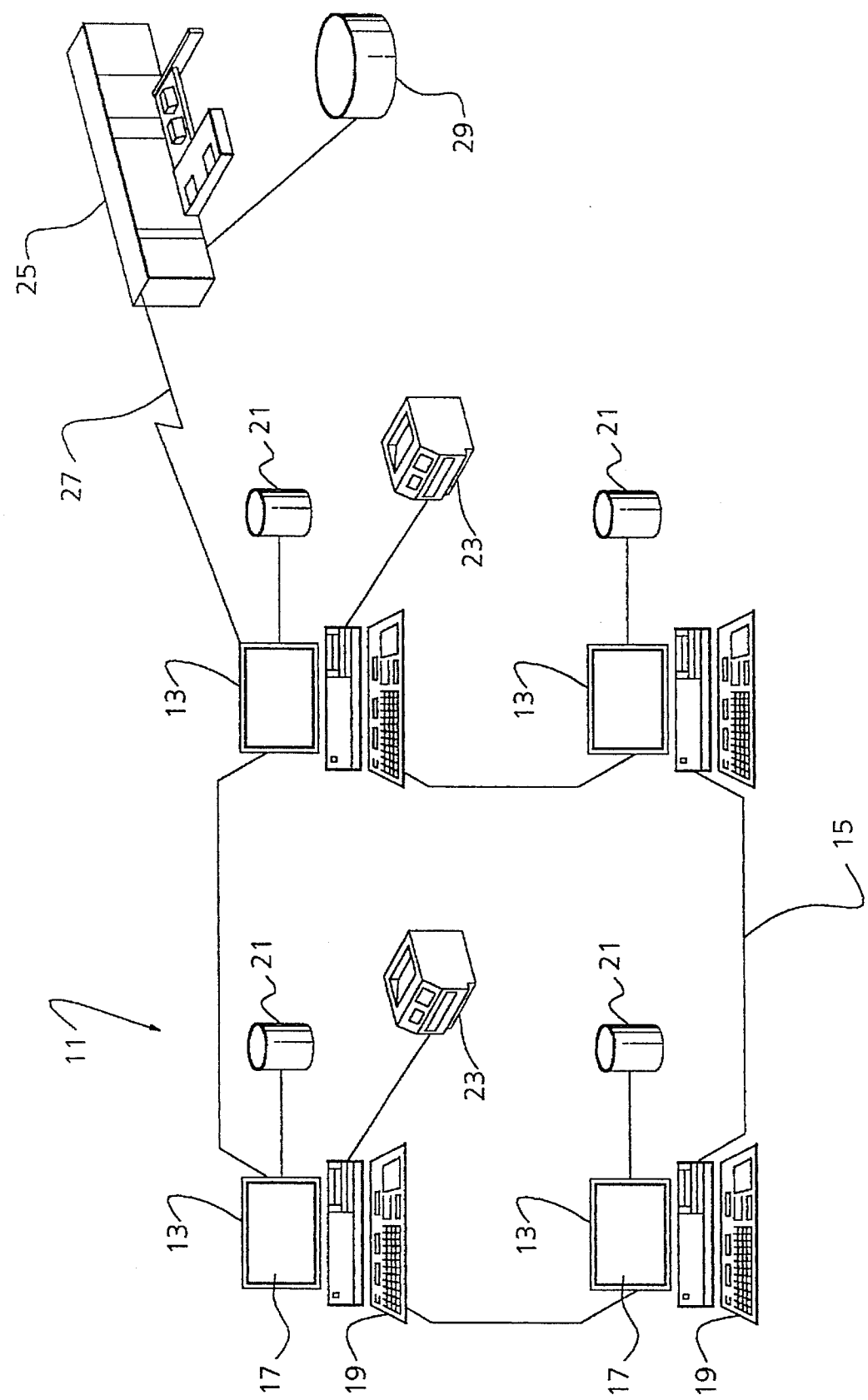
FIG. 1 is a schematic diagram of a data processing system on which the present invention can be practiced.

In FIG. 1, there is shown a schematic diagram of a data processing system 11, upon which the present invention can be practiced. The data processing system 11 includes plural individual computers or workstations 13 which are connected together in a local area network (LAN) 15. Each workstation 13 includes a user interface, which has a display screen 17 and a keyboard 1. Each workstation 13 may also be coupled to a storage device 21 and to a printer or output device 23. One or more such storage devices 21 may be utilized, in accordance with the present invention, to store applications or resource objects which may be periodically accessed by any user within the data processing system 11. The present invention can be implemented on an individual computer 13.

The data processing system 11 may also include a mainframe or host computer 25 that is coupled to one of the workstations by a communication link 27. The host computer 25 may also be coupled to a storage device 29 which may serve as a remote storage for the computers.

Figure 2:
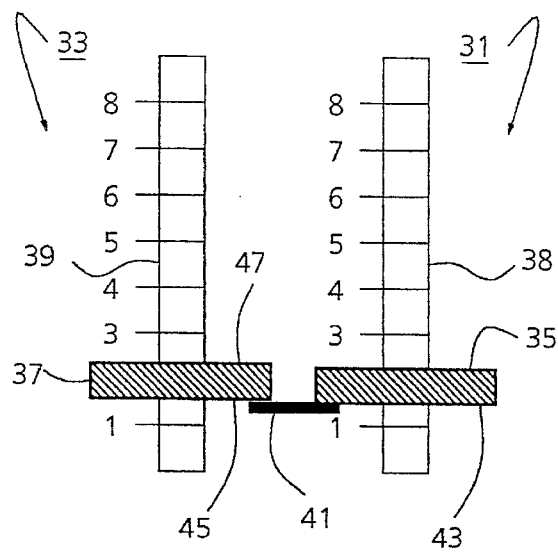
FIGS. 2–5 are schematic views of loosely ganged slider bars of the present invention, in accordance with a preferred embodiment, as are shown on a user interface. The slider bars are shown in various settings among the figures.

In FIG. 2, there are shown two loosely ganged sliders 31, 33 of the present invention, in accordance with a preferred embodiment. Each slider has a slider bar 35, 37, which can move along a track 38, 39 or path. The sliders are displayed on the screen 17 of a computer 13 (see FIG. 1). Each slider bar can move up or down (referring to the orientation of FIG. 2) along the track. A user moves the slider bar in accordance with conventional methods, such as by using a mouse pointer and dragging the slider bar along the path. Alternatively, the user can use the keyboard 19. The sliders shown in FIG. 2 each have a numerical scale labeled along the side of the respective track. Both slider bars 35, 37 in FIG. 2 are located at position 2 of their respective tracks. The two tracks 38, 39 are parallel to each other.

The slider bars 35, 37 are loosely ganged by providing a first one of the slider bars 35 with a pusher 41. The pusher 41 is coupled to the underside 43 of the first slider bar 35 and extends over to the other or second slider bar 37. The pusher 41 is able to touch the underside 45 of the second slider bar 37. In FIG. 2 (and FIGS. 4 and 6), an exaggerated gap is shown between the pusher 41 and the second slider bar 37 to illustrate that the pusher is not coupled to the second slider bar. On a computer screen, the pusher can be represented in different colors or shades than the slider bars. Also, in FIGS. 2–6, the slider bars are provided with diagonal lines to show differentiation with the tracks.

Figure 7:
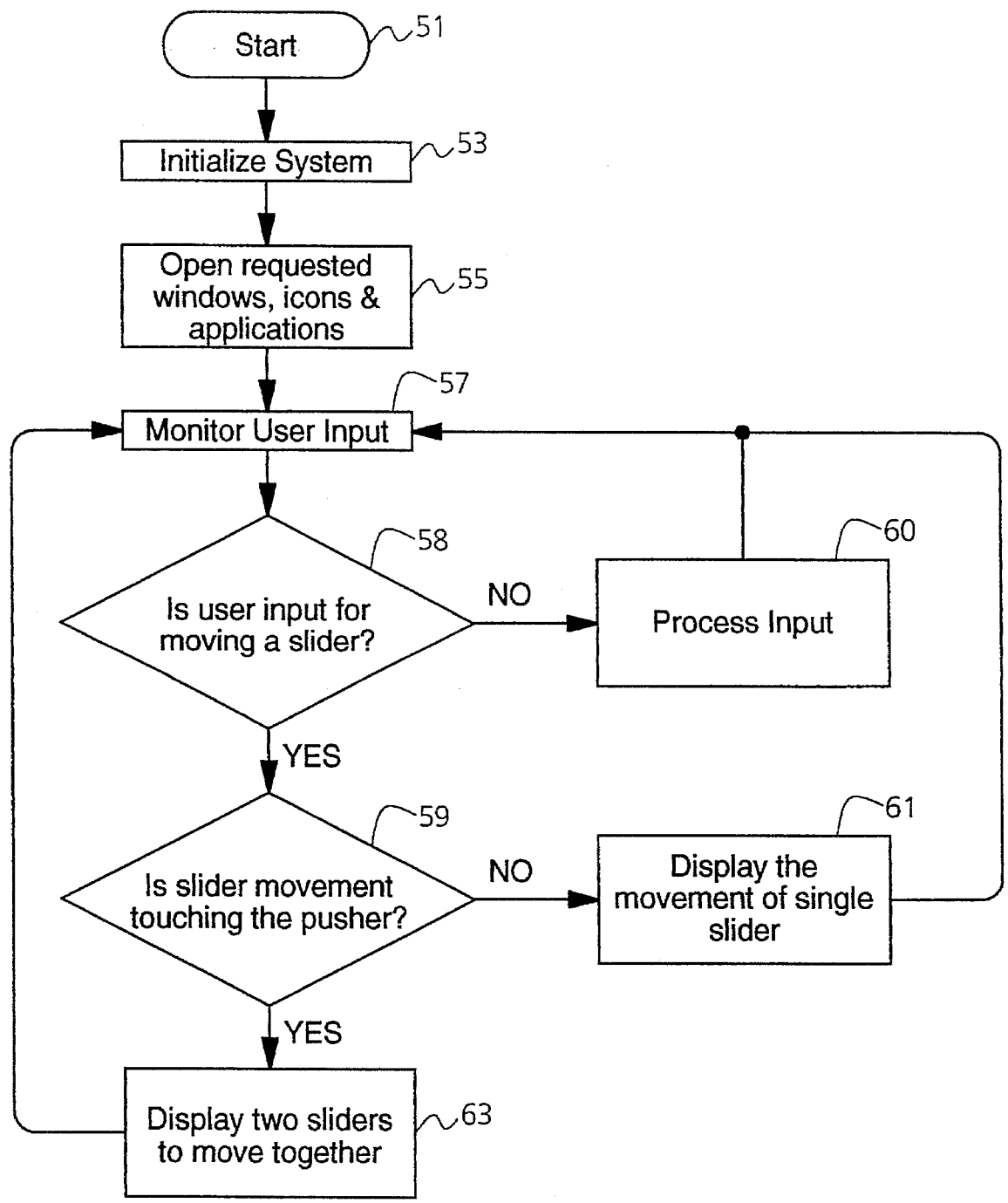
FIG. 7 is a flow chart showing the method of the present invention, in accordance with a preferred embodiment.
Figure 8:
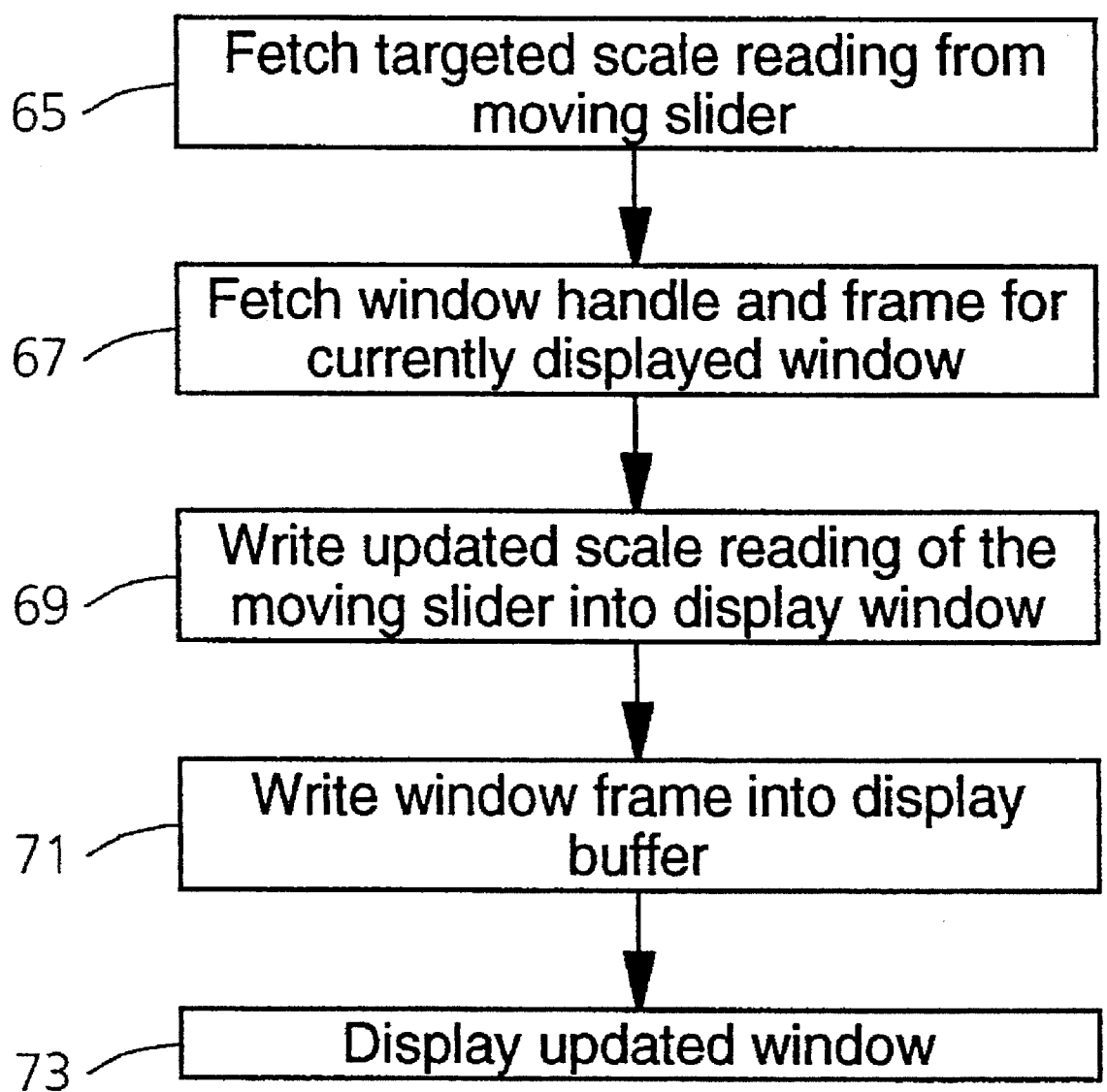
FIG. 8 is a flow chart showing the steps used to display the movement of a single slider as provided in step 61 of FIG. 7.
Figure 9:
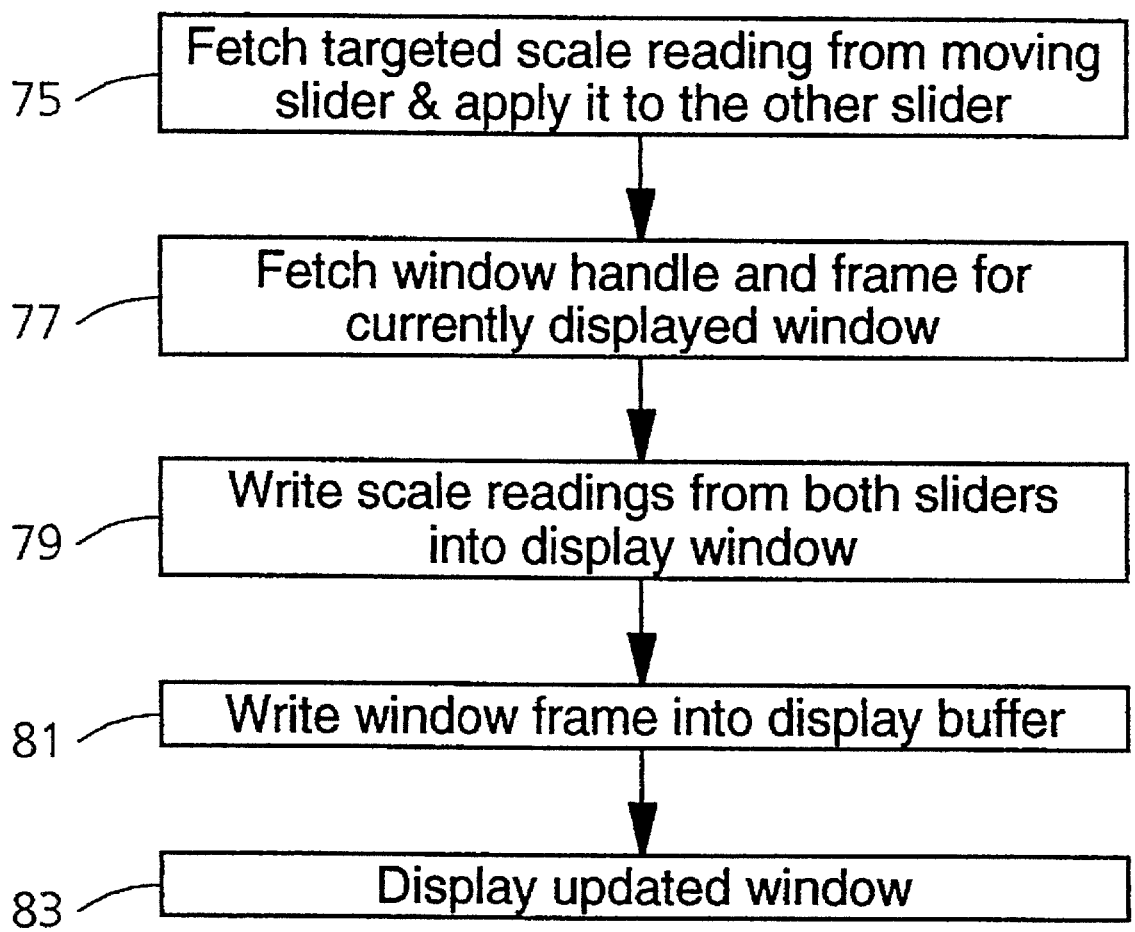
FIG. 9 is a flow chart showing the steps used to display the movement of two sliders together as provided in step 63 of FIG. 7.

Referring now to FIGS. 7–9, the method of the present invention will now be described. In the flow charts, the following graphical conventions are observed: a rectangle for either a process, function or screen display and a diamond for a decision. These conventions are well understood by programmers skilled in the art of user interfaces and the flow charts are sufficient to enable a programmer skilled in the art to write code in any suitable computer programming language, such as BASIC, PASCAL or C for a computer such as the IBM Personal System/2 (PS/2) family of computers which supports these languages.

In FIG. 7, the method is started, step 51. Then, the data processing system is initialized, step 53. The user requests a specific application or applications to be opened, wherein in step 55, the requested applications, windows and icons are opened and displayed on the screen 17. The opened application or window contains the two sliders 31, 33 shown in FIG. 2.

In step 57, the method monitors inputs from the user. Non slider inputs are passed through, step 58, to perform steps 60 not related to the method of the present invention. User inputs that move either the first or second slider bars 35, 37 in any direction cause the method to proceed to step 59. In step 59, the method determines if the second slider 37 is touching the pusher 41 during the detected slider bar movement. If the result of step 59 is NO, then the method proceeds to step 61, wherein the moving slider bar is moved on the display without affecting the stationary slider bar. If the result of step 59 is YES, then the method proceeds to step 63, wherein both slider bars are moved on the display in unison.

Step 61 of FIG. 7 will now be explained in more detail, with reference to FIG. 8. The steps of FIG. 8 update the window with the new slider bar position. The new position was specified by the user in step 57 of FIG. 7. In step 65 of FIG. 8, the method fetches the targeted scale reading from the moving slider bar from memory. For example, if the second slider bar were moved from position 2 to position 5, then position 5 would be the targeted scale reading. (For simplicity in explanation, position 5 is the targeted scale reading. In practice however, this would make the slider bar appear to jump from position 2 to position 5 in a single movement. To provide for smoother slider bar movement, as a practical manner, steps 57 et seq. are reiterated multiple times, wherein the slider bar appears to smoothly slide along the track.) In step 67, the window handle and frame, or other identification, for the currently displayed window are fetched from memory. Then, in step 69, the updated or target scale reading of the moving slider is written into the memory designated for the display window. This updates the position of the moved slider bar to the target position. The now updated window frame, together with the updated slider bar position, is written into the display buffer, step 71. The updated window is then displayed on the screen 17, step 73.

Step 63 of FIG. 7 will now be explained in more detail, with reference to FIG. 9. The steps of FIG. 9 update the window with the new positions of both slider bars. In step 75, the method fetches the targeted scale reading from the moving slider bar and applies it to the other, or nonmoving, slider bar. In step 77, the window handle and frame for the currently displayed window are fetched. Then, in step 79, the updated or targeted scale readings of both slider bars are written into the display window. If the scales for the two sliders are the same, as in FIG. 2, then the scale readings of both slider bars will be the same. For example, if the first slider bar 35 were moved up from position 2 to position 6, as in FIG. 4, then the new scale reading for the second slider bar 37 would also be position 6. However, the scales of the two sliders need not be the same. In this case, the targeted setting of the pushing slider bar will produce a predetermined new setting for the pushed slider bar. The predetermined new setting would then be determined by a correlation table, by a mathematical relationship, etc.

In step 81, the updated window frame, with the updated slider bars, are written into the display buffer. In step 83, the updated window is displayed.

Referring back to FIG. 7, after steps 61 or 63, the method returns to step 57 to await another user input relating to slider bar movement. The method ends when the application containing the slider bar stops.

Figure 3:
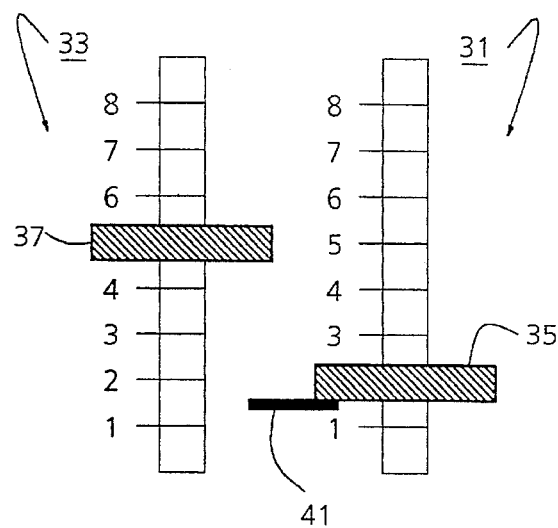

Referring to FIGS. 2–5, some examples of slider bar movement, from a user's perspective, will be described. In FIG. 2, both the first and second slider bars 35, 37 are in their respective position 2. If the user moves the second slider bar 37 up from position 2 to position 5, as shown in FIG. 3, the first slider bar 35 remains at position 2. This is because when the second slider bar 37 is moved up to a higher position, it does not contact the pusher 41. Instead, the second slider bar moves away from the pusher.

Figure 4:
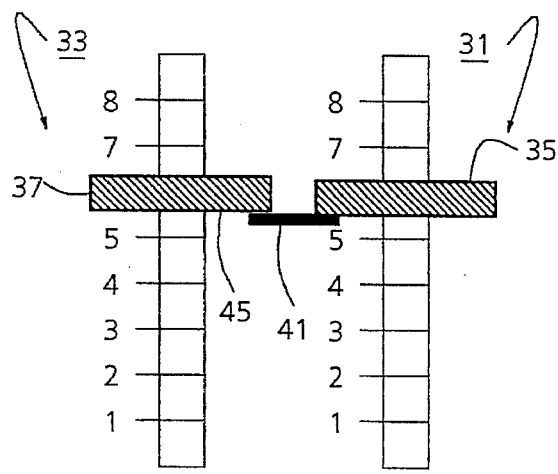

If the user moves the first slider bar 35 up from position 2 to position 6, as shown in FIG. 4, then the second slider bar 37 is pushed from position 5 to position 6. This is because when the first slider bar 35 reaches position 5, the pusher 41 contacts the underside 45 of the second slider bar 37. As the first slider bar continues to traverse up to position 6, the pusher 41 appears to the user to push the second slider bar upwardly.

Figure 5:
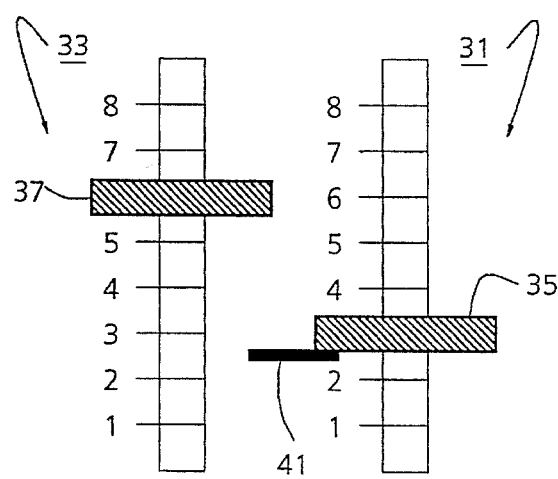

If the user moves the first slider bar 35 down to position 3 from position 6, as shown in FIG. 5, then the second slider bar 37 remains stationary at position 6. This is because the pusher is moved away from the second slider bar.

If the user moves the second slider bar 37 down from position 6 to position 1, then the first slider bar 35 will be pushed down to position 1.

Thus, the first and second slider bars move independently of each other if the pusher 41 does not contact the second slider bar 37. This is accomplished by moving one of the slider bars so as to separate the second slider bar and the pusher from each other. The first and second slider bars move together if the pusher contacts the second slider bar. This is accomplished by moving one of the slider bars so as to bring the pusher together with the second slider bar. Once pusher contact is made, then the two slider bars are ganged and move together.

Although the pusher 41 has been illustrated as contacting the underside 45 of the second slider bar 37, it could extend from the top side of the first slider bar and be adapted to contact the top side 47 (see FIG. 2) of the second slider bar. This would reverse the respective directions of independent movement for the slider bars. Upward movement of the first slider bar would be independent of the second slider bar and downward movement of the second slider bar would be independent of the first slider bar. In addition, the pusher 41 need not be a bar as shown in FIGS. 2–5. Instead, it could be provided with an extension along the direction of the track 38. For example, a backward "L" shaped pusher could be coupled to the underside of the first slider bar 35. Such a pusher could extend downwardly a distance of two positions. If the second slider bar were located at position 3, and the first slider bar were moved upwardly to position 4, then the second slider bar would remain stationary at position 3. Moving the first slider bar upwardly past position 5 would move the second slider bar upwardly. Also, two pushers could be provided, either on a single slider bar or with each slider bar having a pusher. For example, the first slider bar could have two pushers. One, like pusher 41 of FIG. 2 and the other, extending upwardly a distance of three positions. Thus, if the second slider bar were moved a distance greater than three positions above the first slider bar, the first slider bar would be pushed upwardly as well.

Figure 6:
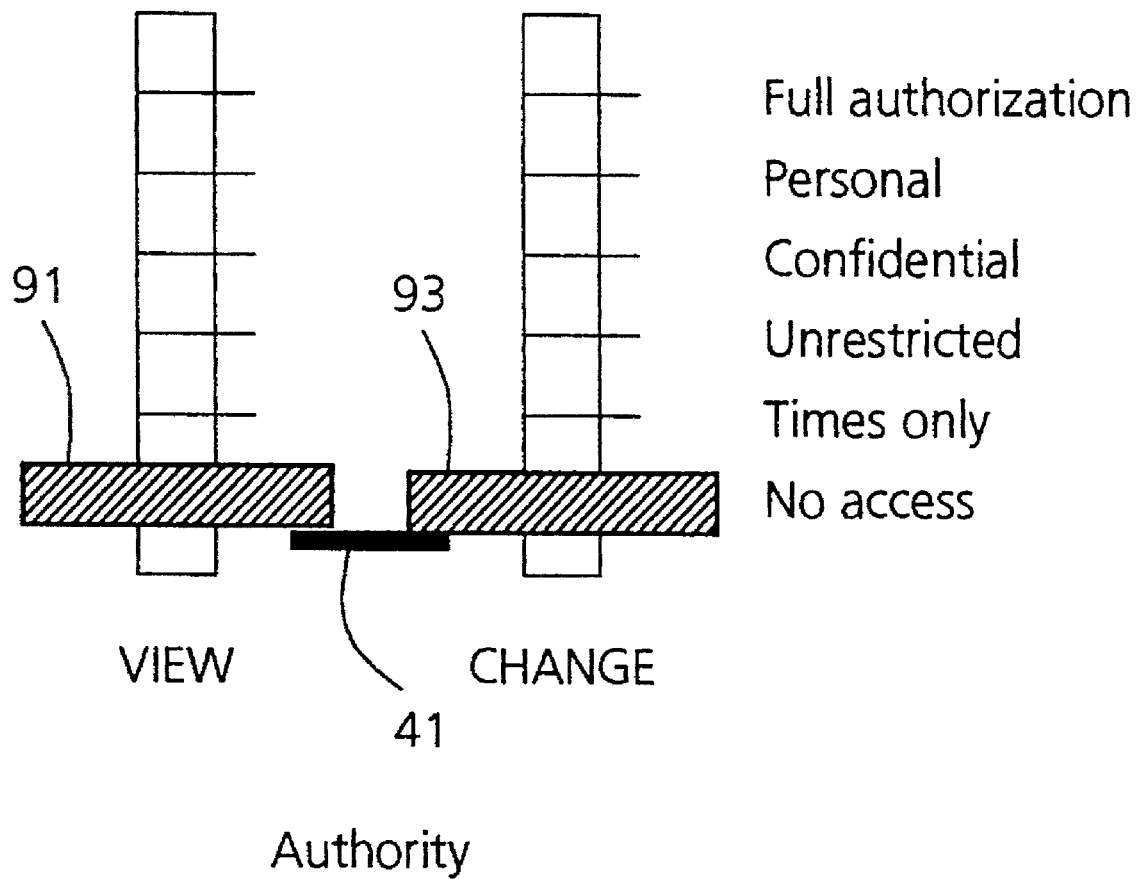
FIG. 6 is a schematic view of loosely ganged slider bars shown with another set of parametrical values.

In FIG. 6, there is illustrated a sample application of the present invention. For a particular user, entries to a calendar can be either viewed or changed in accordance with settable authorization levels. View authority, which is needed to view calendar entries, is controlled by a view slider bar 91. Change authority, which is needed to change or modify the entries in the calendar, is controlled by a changer slider bar 93. The slider bars are movable along different levels of authority, ranging from NO ACCESS (least access) to FULL AUTHORIZATION (greatest access) to either view or change entries. View authority can be increased without increasing change authority. This allows a user to be given the authority to view, but not change, entries. Setting the change authority implies a corresponding view authority. If change authority is increased, then view authority must be equal to or greater than the corresponding change authority, otherwise view authority is increased to the same level as change authority. This prevents the granting of change authority without providing a corresponding view authority. If the view authority is decreasing, then the change authority must be set equal to or less than the corresponding view authority. The loosely ganged sliders 91, 93 make this relationship automatic.

The foregoing disclosure and the showings made in the drawings are merely illustrative of the principles of this invention and are not to be interpreted in a limiting sense.

We claim is:

1. A method of displaying related parameters on a user interface of a data processing system; comprising the steps of:
   a) displaying first and second sliders, said first slider being capable of being moved along a first path and said second slider being capable of being moved along a second path, said first and second paths being separate from each other;
   b) displaying a member coupled to said first slider and extending toward said second path of said second slider so as to contact a portion of said second slider when one of said sliders moves with respect to the other of said sliders in a predetermined direction along said first or second path;
   (c) selecting and moving either said first slider along said first path or said second slider along said second path with an input device.
2. The method of claim 1, further comprising the step of determining if said movement of either said first slider along said first path or said second slider along said second path causes said second slider to contact said member and if so then moving both of said first and second sliders together.
3. The method of claim 1, wherein said one of said first slider that is moving along said first path or said second slider that is moving along said second path is a moving slider and said other of said first slider or second slider is a ganged slider, further comprising the steps of:
   a) determining if said movement of either said first slider along said first path or said second slider along said second path causes said second slider to contact said member and if so that moving both of said first and second sliders together.
   b) said step of moving both of said first and second sliders together further comprises the step of moving said ganged slider with said member and said moving slider.
4. A method of displaying related parameters on a user interface of a data processing system, comprising the steps of:
   a) displaying first and second sliders, said first slider being capable of being moved along a first path and said second slider being capable of being moved along a second path;
   b) displaying a member coupled to said first slider and extending toward said second path of said second slider so as to contact a portion of said second slider when one of said sliders moves with respect to the other of said sliders in a predetermined direction along said first or second path;
   c) selecting and moving either said first slider along said first path or said second slider along said second path with an input device;
   d) determining if said movement of either said first slider along said first path or said second slider along said second path causes said second slider to contact said member and if so then moving both of said first and second sliders together;
   e) said step of determining if said movement causes said second slider to contact said member further comprises the step of moving said respective moving slider without moving said respective nonmoving slider if said second slider does not contact said member.
5. An apparatus for displaying related parameters on a user interface of a data processing system; comprising:
   a) means for displaying first and second sliders, said first slider being capable of being moved along a first path and said second slider being capable of being moved along a second path, said first and second paths being separate from each other;
   b) means for displaying a member coupled to said first slider and extending toward said second path of said second slider so as to contact a portion of said second slider when one of said sliders moves with respect to the other of said sliders in a predetermined direction along said first or second path;
   c) means for selecting and moving either said first slider along said first path or said second slider along said second path with an input device.
6. The apparatus of claim 5, further comprising
   means for determining if said movement of either said first slider along said first path or said second slider along said second path causes said second slider to contact said member and if so then for moving both of said first and second sliders together.
7. The apparatus of claim 5, wherein said one of said first slider that is moving along said first path or said second slider that is moving along said second path is a moving slider and said other of said first slider or second slider is a ganged slider, further comprising;

a) means for determining if said movement of either said first slider along said first path or said second slider along said second path causes said second slider to contact said member and if so then for moving both of said first and second sliders together;

b) said means for determining if said movement causes said second slider to contact said member and if so then for moving both of said first and second sliders together further comprises means for moving said gang slider with said member and said moving slider.

8. An apparatus for displaying related parameters on a user interface of a data processing system, comprising:

a) means for displaying first and second sliders, said first slider being capable of being moved along is first path and said second slider being capable of being moved along a second path;

b) means for displaying a member coupled to said first slider and extending toward said second path of said second slider so as to contact a portion of said second slider when one of said sliders moves with respect to the other of said sliders in a predetermined direction along said first or second path;

c) means for selecting and moving either said first slider along said first path or said second slider along said second path with an input device;

d) means for determining if said movement causes said second slider to contact said member and if so then for moving both of said first and second sliders together;

e) said means for determining if said movement causes said second slider to contact said member further comprises means for moving said respective moving slider without moving said respective nonmoving slider if said second slider does not contact said member.

\* \* \* \* \*